United States Patent [19]

Becker et al.

[11] 4,455,944  
[45] Jun. 26, 1984

[54] DEVICE FOR SEPARATING THE SOLID CHARGE RESIDUES IN A PYROTECHNIC REGULATING UNIT

[75] Inventors: Wilfried Becker, Pöring; Oswald Pepina, Puchheim; Manfred Landmann, Waakirchen, all of Fed. Rep. of Germany

[73] Assignee: Messerschmitt-Bölkow-Blohm GmbH, Fed. Rep. of Germany

[21] Appl. No.: 324,065

[22] Filed: Nov. 23, 1981

[30] Foreign Application Priority Data

Dec. 12, 1980 [DE] Fed. Rep. of Germany ....... 3046817

[51] Int. Cl.³ .............................................. F42B 3/04
[52] U.S. Cl. ...................................... 102/530; 55/401
[58] Field of Search ................................ 102/530–531, 102/367, 368, 370; 280/728, 736, 740–742; 55/401, 404, 441, 440, 477, 527, 528

[56] References Cited

U.S. PATENT DOCUMENTS

| 3,234,716 | 2/1966 | Sevin et al. | 55/401 X |
| 3,618,980 | 11/1971 | Leising et al. | 102/531 X |
| 3,715,131 | 2/1973 | Hurley et al. | 280/736 |
| 3,964,394 | 6/1976 | Wolf | 280/728 X |

Primary Examiner—Harold J. Tudor  
Assistant Examiner—Tyrone Davis  
Attorney, Agent, or Firm—McGlew and Tuttle

[57] ABSTRACT

A device is disclosed for separating solid residues from gases generated by a charge cartridge having a gas discharged end and used in a final pyrotechnic regulatory unit. The device includes a casing having a recess therein and a bottom end face. The cartridge is mounted in the casing with its discharged end facing the bottom end of the casing to define a first passage. A sleeve is positioned in the recess between the cartridge and the casing to define a second passage communicating with the first passage. The first and second passages are lined with ribs or threads extending transversely to the flow direction of the gas in the passages.

7 Claims, 6 Drawing Figures

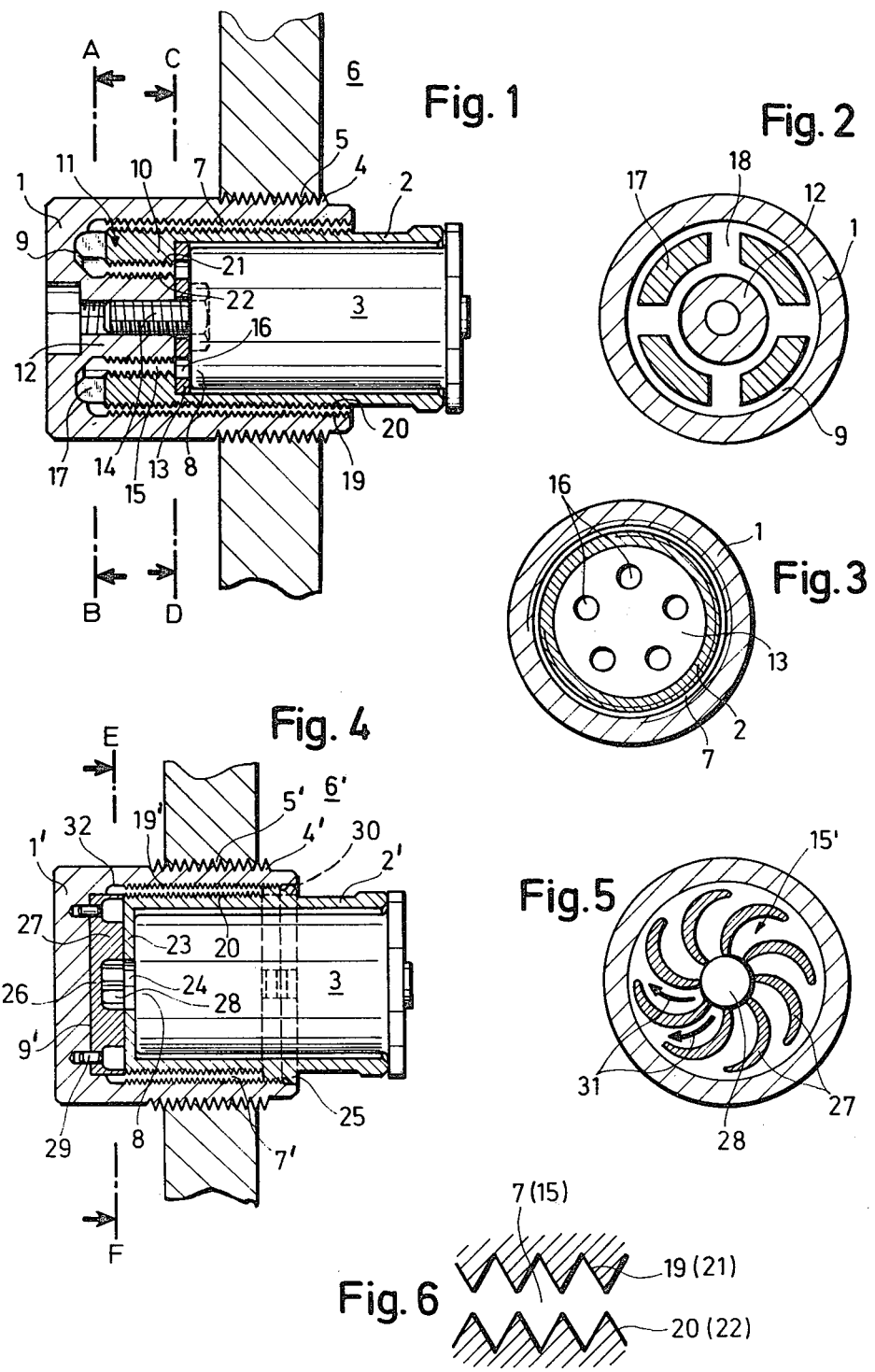

DEVICE FOR SEPARATING THE SOLID CHARGE RESIDUES IN A PYROTECHNIC REGULATING UNIT

FIELD AND BACKGROUND OF THE INVENTION

The present invention relates to a device for separating the solid residues from the gases generated by a charge cartridge in a pyrotechnic regulating unit.

Such a regulating unit has, for example, a piston guided in a cylinder, on which the gas generated by the charge cartridge acts. Solid charge residues also arrive with the gas of the cartridge in the regulating unit. These residues accumulate at points which are hard to clean because they are difficult to reach. Cleaning the regulating unit of these residues is necessary, however, since the solid residues cause damage, for example, to the packings of the device.

It was found that no effective separation of the solid residues can be achieved by the use of a filter, for example, of wire mesh, arranged between the cartridge and the regulating unit. This could be due to the intermittent gas pressure wave by which the solid residues are thrown out again from the filter. Apart from that, the installation of such a filter requires a number of parts, and is therefore relatively expensive.

SUMMARY OF THE INVENTION

The invention is based on the problem of providing a device consisting of a few easy-to produce parts of a pyrotechnic regulating unit with which the solid residues can be substantially removed from the gas generated by the propellant gas cartridge and from which the separated solid charge residues can be removed in a simple manner.

Accordingly, an object of the invention is to provide a device for separating solid residues from gases generated by a charge cartridge having a gas discharge end and used in a final pyrotechnic regulatory unit comprising, a casing having a recess with a bottom end face, means supporting the cartridge with its gas discharge end facing and spaced from the bottom end face of the casing to define a first passage in the casing recess, and a sleeve provided in the recess and supported between the cartridge and the casing to define a second passage communicating with the first passage and extending in an angle to the first passage.

Another object of the invention is to provide such a device which includes guide vanes in the first passage to direct the gases.

It was found that practically no solid residues issue from the second interval or passage between the sleeve and the case of the inventive device. The device according to the invention thus positively protects points of the registering unit that are difficult to reach against contamination by the solid charge residues. Cleaning of the device is simple by removing the cartridge and the intermediate sleeve from the case. The intermediate sleeve, and if necessary the guide vanes, represent practically the only additional parts for separating the solid charge residues.

A still further object of the invention is to provide a device for separating solid charge residues from gases of a charge cartridge for a pyrotechnic regulating unit which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preffered embodiments of the invention are illustrated.

BRIEF DESCRIPTION OF THE DRAWINGS

In the drawings

FIG. 1 is a longitudinal sectional view taken through a first embodiment of the inventive device;

FIG. 2 is a sectional view taken along line A-B in FIG. 1;

FIG. 3 is a sectional view taken along line C-D in FIG. 1;

FIG. 4 is a longitudinal sectional view taken through a second embodiment of the inventive device;

FIG. 5 is a sectional view taken along line E-F in FIG. 4; and

FIG. 6 is a longitudinal sectional view through one of the two intervals of the device for separating solid residues on a greatly enlarged scale.

DESCRIPTION OF THE PREFERRED EMBODIMENTS

The device comprises a cylindrical case 1 and a sleeve 2, arranged concentrically in the recess of the case 1. A cartridge 3 is inserted into sleeve 2. Case 1 has thread 4 and is screwed to a cylindrical bore 5 of the wall of a chamber 6 of the regulating unit, so that chamber 6 is hermetically sealed from the outside.

Sleeve 2 is arranged at a radial distance from case 1, so that an annular passage or interval 7 is formed. The gas outlet end 8 of cartridge 3 is arranged at a distance from the inner end face 9 of case 1, so that another passage 15 is formed between cartridge 3 and case 1.

In the embodiment according to FIGS. 1 to 3, sleeve 2 has, at gas outlet end 8 of cartridge 3, an annular shoulder 10 projecting radially to the inside. The inner end face 9 of case 1 is formed at its bottom, with an annular groove generally designated 11, which receives annular shoulder 10. At a distance from annular shoulder 10 is arranged journal or post 12 which is integral with case 1 and whose outer circumferential surface forms the inner circumferential surface of annular groove 11.

Post 12 and annular shoulder 10 are arranged at the same level in case 1, the end face of post 12 facing cartridge 3 and forming the bearing for a perforated disc 13, which is secured with a bolt 14 extending in post 12. Perforated disc 13, which forms a stop for cartridge 3, bears with its outer rim on annular shoulder 10.

Annular shoulder 10, post 12, end face 9 and perforated disc 13 thus enclose the other passage 15 in the embodiment according to FIGS. 1 to 3.

Holes 16 of perforated disc 13 are arranged in a circle, as can be seen from FIG. 3, and are aligned with annular passage 15. As can be seen from FIG. 2, four annular segments 17 are provided on the inner end face 9 of the case and on the bottom of annular groove 11 respectively, so that four radial channels 19 that are staggered by 90° to each other, are formed.

Annular segments 17 serve as bearing surfaces for sleeve 2, which is held from moving in the opposite direction by perforated disc 13. Channels 18 connect annular passage 15 which annular passage 7, between the outer circumferential surface of sleeve 2 and the inner circumferential surface of case 1.

The inner circumferential surface of case 1, the outer circumferential surface of sleeve 2, the inner circumferential surface of annular shoulder 10, and the outer circumferential surface of post 12 are each provided with threads 19, 20 and 21, 22 respectively which are spaced from each other.

Threads 19 and 20, on the one hand, and threads 21 and 22, on the other hand, represent transverse fins or baffle plates in passages 7 and 15. The solid residues of the gases issuing from cartridge 3, passing through holes 16 of perforated disc 13, through passage 15 and through channels 18, reversing their direction of flow, and finally through passage 7, are separated substantially on the transverse fins formed by threads 19 to 22, before the gases arrive from passage 7 to chamber 6.

It was found that a particularly good cleaning effect can be achieved if threads 19, 20 and 21, 22 respectively, are so arranged that the crests oppose each other, as shown schematically in FIG. 6. This can be achieved in a simple manner by designing one of the threads 19, 20 and 21, 22 respectively, as a right-hand thread and the other as a left-hand thread.

This way the gas flowing through passes 15 and 7 is compressed in the range of the crests and expands in the range of the thread bottoms. This results in a force component transverse to the main direction of flow which leads to the deposit of the solid residues on threads 19 to 22. The device shown in FIGS. 1 to 3 thus consists only of a few parts, namely of case 1, sleeve 2, perforated disc 13 and bolt 14, and these parts, including threads 19 to 22, are simple to produce.

The cleaning of the device is likewise simple. After removing case 1 from the wall of chamber 6 and burnt-out cartridge 3, it is only necessary to loosen bolt 14, and sleeve 2 with perforated disc 13 can be removed from case 1. All surfaces on which solid residues can be deposited, that is, particularly threads 19 to 22, are then freely accessible and easy to clean.

The embodiment according to FIGS. 3 and 5, (showing similar elements with the same number plus a prime) differs from that according to FIGS. 1 to 3 particularly in that annular shoulder 10 of sleeve 2 is replaced by a sleeve base 23 with a central bore 22. Post 12 has been omitted, so that the inner end face 9' of case 1' is a plane. Sleeve 2' has a threaded section 25 at the end of passage 7' remote of sleeve base 23, which engages thread 19' on the inner circumference of case 1'. A plate 26 is provided between the gas outlet end 8 and bore 23 respectively in sleeve base 23 and end face 9' of the case. Plate 26 has several guide vanes 27 on the side facing sleeve base 23, which are curved in the same direction and extend from a cylindrical space 28 underneath bore 24 in sleeve base 23 radially to the outside toward the inner circumferential surface of case 1'.

Plate 26 is fixed axially by sleeve 2', which engages threaded section 25 with the female thread 19' of case 1'. In order to prevent rotation, plate 26 has pins 29 which engages corresponding bores on the inner end face 9' of case 1'. In threaded section 25, sleeve 2' has continuous longitudinal grooves 30 for the passage of gas, one of which is shown in FIG. 4 in broken lines.

The clearing of solid residues from the gases generated by cartridge 3 is effected in the embodiment according to FIGS. 4 and 5 additionally in that guide vanes 27 so deflect the gases entering cylindrical space 28 through bore 24 in sleeve base 23 in the direction of arrows 31 that they (the gases) are set in rotation. The resulting centrifugal forces then throw the solid residues to the inner circumferential surfaces of case 1' in the range of threaded groove 32 which can be somewhat widened at this end. The embodiment shown in FIGS. 4 and 5 is characterized by a short axial form, compared to that according to FIGS. 1 to 3.

Cartridge 3 is a standard cartridge consisting of a cartridge sleeve with a charge (e.g. a nitrate-or azide component).

While specific embodiments of the invention have been shown and described in detail to illustrate the application of the principles of the invention, it will be understood that the invention may be embodied otherwise without departing from such principles.

We claim:

1. A device for separating solid residues from gases generated by a charge cartridge having a gas discharge end and used in a final pyrotechnic regulator unit comprising:
   a casing having a recess in a bottom end face;
   means supporting the cartridge with its gas discharge end facing and spaced from the casing bottom end to define a first passage in the casing recess;
   a sleeve connected in the recess and supported between the cartridge and said casing to define a second passage communicating with said first passage and extending parallel to at least a portion of said first passage to reverse a flow direction of gases from the cartridge;
   a plurality of fins extending into at least one of said first and second passages, said fins extending transversely to the flow of gases in said one of said first and second passages; and
   said first and second passages both including annular sections having inner and outer bounding walls, said fins defined on said inner and outer walls of said annular sections, whereby solid residues in the gases passing through the first and second passages are separated from the gases and deposited on said walls of said first and second passages.

2. A device according to claim 1, wherein the transverse fins of each wall is aligned with respective transverse fins on each outer wall.

3. A device according to claim 1, wherein said fins comprise threads.

4. A device according to claim 3, wherein said transverse fins comprise threads, the threads on each outer wall having turns which are reverse with respect to the threads on each inner wall.

5. A device according to claim 1, including a plurality of guide vanes defined in said first passage for dividing at least a portion of said first passage into generally radially extending passage portions.

6. A device according to claim 5, wherein each of said vanes is curved with respect to the radial direction of said first passage, each vane being curved in the same direction whereby gases passing through said passage portions are rotated.

7. A device according to claim 1, including a post extending from said casing bottom end face forming said means for supporting, said sleeve having an inner annular surface defining a portion of said first passage with an outer annular surface of said post.

* * * * *